US012703119B2

(12) United States Patent
Kou et al.

(10) Patent No.: US 12,703,119 B2
(45) Date of Patent: Aug. 11, 2026

(54) SPLIT-TYPE DEVICE FOR CONTINUOUSLY AND RAPIDLY SEPARATING STEEL CORD BELT

(71) Applicant: TAIYUAN UNIVERSITY OF TECHNOLOGY, Shanxi (CN)

(72) Inventors: Ziming Kou, Shanxi (CN); Baofu Kou, Shanxi (CN); Yandong Wang, Shanxi (CN); Cong Han, Shanxi (CN); Guangping Huang, Shanxi (CN); Haiqing Wang, Shanxi (CN); Jiabao Xue, Shanxi (CN)

(73) Assignee: TAIYUAN UNIVERSITY OF TECHNOLOGY, Shanxi (CN)

( * ) Notice: Subject to any disclaimer, the term of this patent is extended or adjusted under 35 U.S.C. 154(b) by 141 days.

(21) Appl. No.: 18/747,371

(22) Filed: Jun. 18, 2024

(65) Prior Publication Data

US 2025/0269548 A1 Aug. 28, 2025

(30) Foreign Application Priority Data

Feb. 26, 2024 (CN) ......................... 202410209307.6

(51) Int. Cl.
*B26D 1/02* (2006.01)

(52) U.S. Cl.
CPC .................................... *B26D 1/025* (2013.01)

(58) Field of Classification Search
CPC ........ B26D 1/025; B26D 3/282; B26D 3/005; B26D 1/03; B26D 2007/0664; B26D 3/28; B26D 7/0625; B26D 7/2628; B26D 11/00; B23B 38/0004; B21D 5/08; B21D 39/00; B23D 23/02; B23D 33/08; B23D 35/004; B23D 35/007; B65G 15/36; Y10T 83/787; Y10T 83/7876; Y10T 83/659; Y10T 83/789
USPC ......... 225/29; 83/162, 368, 425.2, 438, 448, 83/507, 663, 676, 829, 870; 428/172, 428/577, 598, 600; 29/428, 525, 302, 29/525.6
See application file for complete search history.

(56) References Cited

U.S. PATENT DOCUMENTS 2,973,549 A * 3/1961 Hurst ........................ B29B 7/64
425/168
3,684,618 A * 8/1972 Geshwender ........ B31D 3/0261
156/197

(Continued)

FOREIGN PATENT DOCUMENTS

CN 106003765 10/2016
CN 213830808 7/2021

(Continued)

*Primary Examiner* — Ghassem Alie
(74) *Attorney, Agent, or Firm* — JCIPRNET

(57) ABSTRACT

A split-type device for continuously and rapidly separating a steel cord belt includes a power mechanism, a driving part, a frame, a moving part, a pressing part, a cutting mechanism, a flat cutting part, a large-toothed cutting part, a small-toothed cutting part, connectors, and a holding mechanism. The power mechanism includes the driving part, the frame, the moving part, and the pressing part. The driving part and the pressing part are mounted on the frame and are configured for driving and clamping the steel cord belt. The moving part is mounted below the frame and is configured for moving the power mechanism.

7 Claims, 10 Drawing Sheets

(56) References Cited

U.S. PATENT DOCUMENTS

| | | | | | |
|---|---|---|---|---|---|
| 4,044,444 | A * | 8/1977 | Harris | B23P 19/022 29/727 |
| 4,569,265 | A * | 2/1986 | Kawashima | B26D 1/245 83/345 |
| 4,572,046 | A * | 2/1986 | Still | B26D 3/003 83/555 |
| 2004/0079209 | A1* | 4/2004 | Arita | B26D 1/03 83/13 |
| 2012/0160075 | A1* | 6/2012 | Matsudaira | B26D 3/282 83/874 |
| 2015/0270034 | A1* | 9/2015 | Wabnegger | B21F 11/00 241/101.2 |
| 2015/0273720 | A1* | 10/2015 | Endo | B26D 1/245 83/425.1 |

FOREIGN PATENT DOCUMENTS

| | | | | |
|---|---|---|---|---|
| CN | 115179357 | | 10/2022 | |
| CN | 115179357 | A * | 10/2022 | B26D 7/2628 |

* cited by examiner

SPLIT-TYPE DEVICE FOR CONTINUOUSLY AND RAPIDLY SEPARATING STEEL CORD BELT

CROSS-REFERENCE TO RELATED APPLICATION

This application claims the priority benefit of China application serial no. 202410209307.6, filed on Feb. 26, 2024. The entirety of the above-mentioned patent application is hereby incorporated by reference herein and made a part of this specification.

BACKGROUND

Technical Field

The present disclosure relates to the technical field of operation and maintenance equipment for mining transport machinery, and in particular, to a split-type device for continuously and rapidly separating a steel cord belt.

Description of Related Art

A split-type device for continuously and rapidly separating a steel cord belt is a steel cord belt separating device generally used in production lines or processing techniques. This device is designed to improve production efficiency and reduce labor costs while ensuring the accuracy and stability of the separation process.

A utility model patent with the publication number of CN213830808U titled "Layered Rubber Belt Stripping Machine" discloses a layered rubber belt stripping machine. The structure of the layered rubber belt stripping machine provided by the patent is shown in FIG. 11 and includes a fixed frame, a pullable sliding seat, fixed half clamp rings, a stripping ring cutter, a pressure cylinder, wheels, a wire traction bar, and so on. The belt cover is inserted from the front side of the fixed half clamp rings and the rear end of the belt is clamped and fixed. The stripping ring cutter is tightened by the pressure cylinder to fixedly clamp the belt to be stripped. After the clamping and cutting actions are completed, the pullable sliding seat is driven to move by a motor via the wire traction bar to remove the outer rubber layer of the belt to be stripped. This device requires multiple repetitions in one direction to remove the rubber layer on one side of the belt joint and cannot separate the steel cord layer.

An invention patent with the publication number of CN106003765A, owned by Yanzhou Coal Mining Company Limited, discloses a belt joint steel cord rapid separator and a separation method thereof. The structure of the belt joint steel cord rapid separator provided by the patent is shown in FIG. 12 and includes a workbench, a cutter, longitudinal guide rails, a small lead screw, transverse guide rails, a trolley, a crank, a cutting motor, a slotting tool, gears, a rack, a drive motor, and so on. The belt joint is laid flat on the workbench and the cutter is aligned with one of the steel cords. The cutting depth of the cutter is adjusted via the small lead screw. After the cutting motor is started, the trolley is pushed manually or electrically to move longitudinally and the top rubber layer on the steel cord is removed. The front end of the slotting tool bar is inserted at the end of the steel cord in the belt joint and moves along the steel cord to separate the bottom rubber layer from the steel cord. This device can only remove the rubber layer from one steel cord each time, and the operation needs to be repeated dozens of times to strip the whole belt, so the work efficiency is not high.

An invention patent with the publication number of CN115179357A discloses a device for separating steel cords of a conveyor belt. The device for separating steel cords of a conveyor belt provided by the patent is shown in FIG. 13 and includes a mounting base, upper and lower cases, a guide component (including guide parts and guide shafts), cutting mechanisms, cutters (including flat blades and shaped blades), adjustment components, a delivery mechanism (including a drum, a first driving part, a press roller, a second driving part, and gears), and so on. After the belt is fed from the guide component, the first and the second driving part are started, and the belt is delivered to the cutting mechanisms via the drum and the press roller of the delivery mechanism. The adjustment components make the cutting mechanisms clamp the belt. The delivery mechanism is then reversely driven to enable the flat blades on the cutting mechanisms to complete the cutting and separation of the top and bottom rubber layers of the belt. After that, the cutters are replaced by the shaped blades, and the above operation is repeated once to complete the separation of the steel cords. However, during the separation of the steel cords, the actual situation that the thickness of the steel cords of the belt varies after long-term use is not considered and the steel cords and the cutters may easily be damaged if the opening diameter of the shaped blades is the same as the original diameter of the steel cords. Besides, the delivery mechanism needs to change directions four times in a single operation and the cutters are replaced manually, so the working process is discontinuous.

SUMMARY

The present disclosure provides a split-type device for continuously and rapidly separating a steel cord belt to solve the problems in the prior art.

The present disclosure solves the technical problems through the following technical solutions.

The present disclosure provides a split-type device for continuously and rapidly separating a steel cord belt, which includes a power mechanism, a driving part, a frame, a moving part, a pressing part, a cutting mechanism, a flat cutting part, a large-toothed cutting part, a small-toothed cutting part, connectors, and a holding mechanism, the power mechanism including the driving part, the frame, the moving part, and the pressing part, where the driving part and the pressing part are mounted on the frame and are configured for driving and clamping the steel cord belt;

the moving part is mounted below the frame and is configured for moving the power mechanism.

Further, the driving part includes a motor, a motor base, a gearbox, a power roller, and a driving gear, where the motor and the motor base are connected via bolts, the motor serves as a power source and power is transmitted to the power roller through an output shaft of the gearbox, and the driving gear is mounted on the power roller on one side of the motor.

Further, the pressing part includes pressure nuts, a driven gear, a press roller, press roller sliding blocks, and disc springs, where the press roller sliding blocks on two ends of the press roller are adjusted to change a position of the press roller and a distance between the press roller and the power roller changes accordingly;

the disc springs are respectively mounted between the pressure nuts and the press roller sliding blocks; the pressure nuts are adjusted to change an elastic force of the disc springs and the press roller tightly presses the steel cord belt against the power roller to provide sufficient friction for the steel cord belt; the driven gear is mounted on one end of the press roller and meshes with the driving gear on the power roller; the press roller rotates along with the power roller, a surface of the press roller receives friction evenly, and a service life of the press roller is increased.

Further, the moving part includes moving wheels, moving wheel connecting rods, and round nuts, where each of the moving wheel connecting rods is mounted in mounting holes on two sides of a bottom of the frame and is fixedly connected by two of the round nuts; the moving wheels are respectively mounted on external sides of the round nuts and are configured for moving the power mechanism.

Further, the cutting mechanism, including the flat cutting part, the large-toothed cutting part, and the small-toothed cutting part, is mounted on the frame and is connected via first connectors; the steel cord belt sequentially passes through the flat cutting part, the large-toothed cutting part, and the small-toothed cutting part for separation of a top rubber cover and a bottom rubber cover of the steel cord belt, primary separation of a steel cord layer, and secondary separation of the steel cord layer; the flat cutting part, the large-toothed cutting part, and the small-toothed cutting part are transversely and longitudinally connected via second connectors and third connectors respectively.

Further, the flat cutting part, the large-toothed cutting part, and the small-toothed cutting part each include a cutter seat, a cutter, a handle positioning mechanism, and a cutter rack, where the handle positioning mechanism includes handles, hand-crank seats, cutter adjustment seats, and sleeve rods; the hand-crank seats are fixedly connected to the cutter rack, the handles are turned to adjust vertical positions of the cutter adjustment seats, and the cutter seat and the cutter are configured for moving up and down freely; the cutter is divided into three types: a flat cutter, a large-toothed cutter, and a small-toothed cutter, each being mounted on the cutter seat via bolts; the cutter adjustment seats are worm drive devices configured for outputting rotation of the handles into a vertical linear motion; the cutter adjustment seats are integrated by connecting worms through the sleeve rods.

Further, the flat cutter includes an upper flat cutter and a lower flat cutter, where when the power roller drives the steel cord belt to move, the upper flat cutter and the lower flat cutter simultaneously cut the top rubber cover and the bottom rubber cover of the steel cord belt;

the large-toothed cutter and the small-toothed cutter each include an upper toothed cutter and a lower toothed cutter, each having a semicircular blade, and the upper toothed cutter and the lower toothed cutter fit together to form a circular blade; the circular blade of the large-toothed cutter has a diameter of D1=(d+L)/2, a diameter of the steel cords being d and a thickness of the steel cord layer being L; the diameter D1 of the circular blade of the large-toothed cutter is larger than the diameter of the steel cords, and the primary separation of rubber between the steel cords is completed without damaging the steel cords and the circular blade;

the circular blade of the small-toothed cutter has a diameter of D2 being equal to the diameter d of the steel cords, and the secondary separation of the rubber between the steel cords is completed.

Further, the connectors include the first connectors, the second connectors, and the third connectors, where the first connectors each consist of a hexagon short bolt and a nut and are configured for connecting the flat cutting part, the large-toothed cutting part, and the small-toothed cutting part to the frame;

the second connectors and the third connectors each consist of a hexagon bolt, a nut, and a threaded sleeve and are configured for transversely and longitudinally connecting the flat cutting part, the large-toothed cutting part, and the small-toothed cutting part.

Further, the holding mechanism includes a holding rack, holding rollers, roller lock pieces, and holding wheels, where the holding rollers are mounted in mounting holes on two sides of the holding rack, the roller lock pieces are externally mounted on two ends of each of the holding rollers to prevent each of the holding rollers from falling off, and the holding wheels are mounted on a bottom of the holding rack and are configured for moving the holding mechanism.

The present disclosure has the following advantages.

(1) According to the split-type device for continuously and rapidly separating a steel cord belt of the present disclosure, the cutters are fixed, the press roller is fixed and tightly pressed against the steel cord belt by the press roller sliding blocks and the pressure nuts, and the drive roller and the press roller are forced to rotate by a single motor to complete separation of the steel cords in the steel cord belt. Fewer power sources and moving components are required and rotation is implemented, so that the structure and motion of the device are simplified.

(2) The cutting mechanism of the present disclosure uses three types of cutters arranged in parallel to perform, on the steel cord belt in sequence, the separation of the top and bottom rubber covers, the primary separation of the steel cord layer, and the secondary separation of the steel cord layer. Continuous separation of the steel cords can be completed in a single pass, which eliminates the defects that the cutters need to be replaced and the movement direction of the steel cord belt should be reversed in the existing steel cord belt separation techniques, thereby reducing the operation time and simplifying the operation process.

(3) According to the present disclosure, the steel cord layer is separated in two steps. The primary separation is performed by the large-toothed cutter. The circular blade of the large-toothed cutter has a diameter of D1=(d+L)/2, the diameter of the steel cord being d and the thickness of the steel cord layer being L. The diameter D1 of the circular blade of the large-toothed cutter is larger than the diameter of the steel cord, to avoid damages to the blade and the steel cords due to bending deformation of the steel cords. The secondary separation is performed by the small-toothed cutter. The circular blade of the small-toothed cutter has a diameter D2 being equal to the diameter d of the steel cord, and the rubber covered on the steel cords is removed completely.

(4) The handle positioning mechanism in the present disclosure adopts an integral connection design with sleeves. The handles can be turned to enable synchronous rotation of the worm wheels and worms in the cutter adjustment seats, so that the cutter seat and the cutter can move as a whole, which optimizes the operation process.

(5) The holding mechanism and the frame of the power mechanism are in a split structure in the present disclosure, and the number of the holding mechanism can be set according to the length of the belt to be separated.

Definitely, any product applying the present disclosure does not necessarily need to achieve all the above-mentioned advantages at the same time.

BRIEF DESCRIPTION OF THE DRAWINGS

To illustrate the technical solutions in the embodiments of the present disclosure more clearly, the accompanying drawings required for the description of the embodiments are introduced briefly in the following. Apparently, the accompanying drawings in the following description show merely some embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described below with reference to the accompanying drawings in the embodiments of the present disclosure. It is obvious that the embodiments to be described are only a part rather than all of the embodiments of the present disclosure. All other embodiments derived by persons of ordinary skill in the art based on the embodiments of the present disclosure without creative efforts shall fall within the protection scope of the present disclosure.

Figure 1:
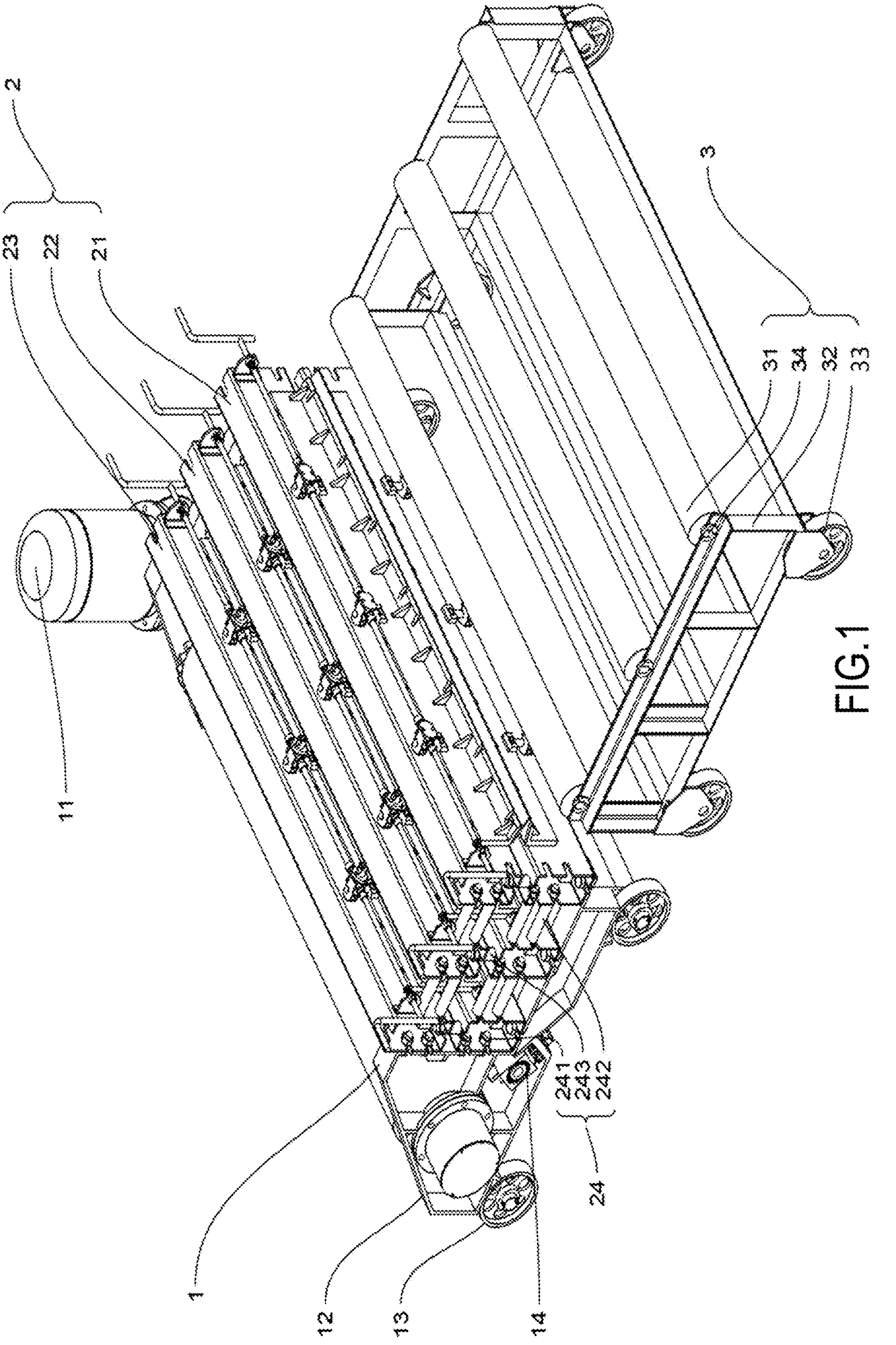
FIG. 1 is a schematic three-dimensional view of the structure of a split-type device for continuously and rapidly separating a steel cord belt.
Figure 2:
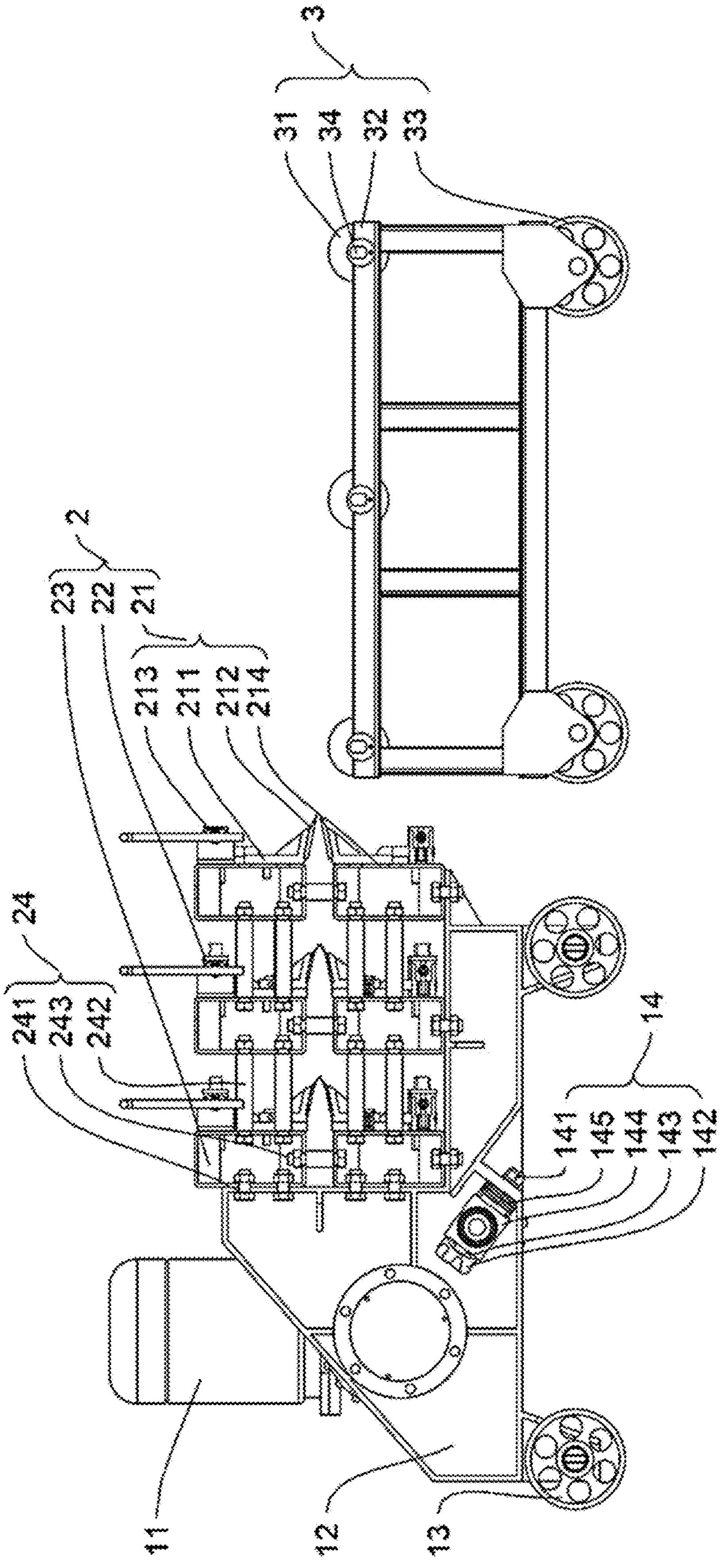
FIG. 2 is a front view of the split-type device for continuously and rapidly separating a steel cord belt.
Figure 3:
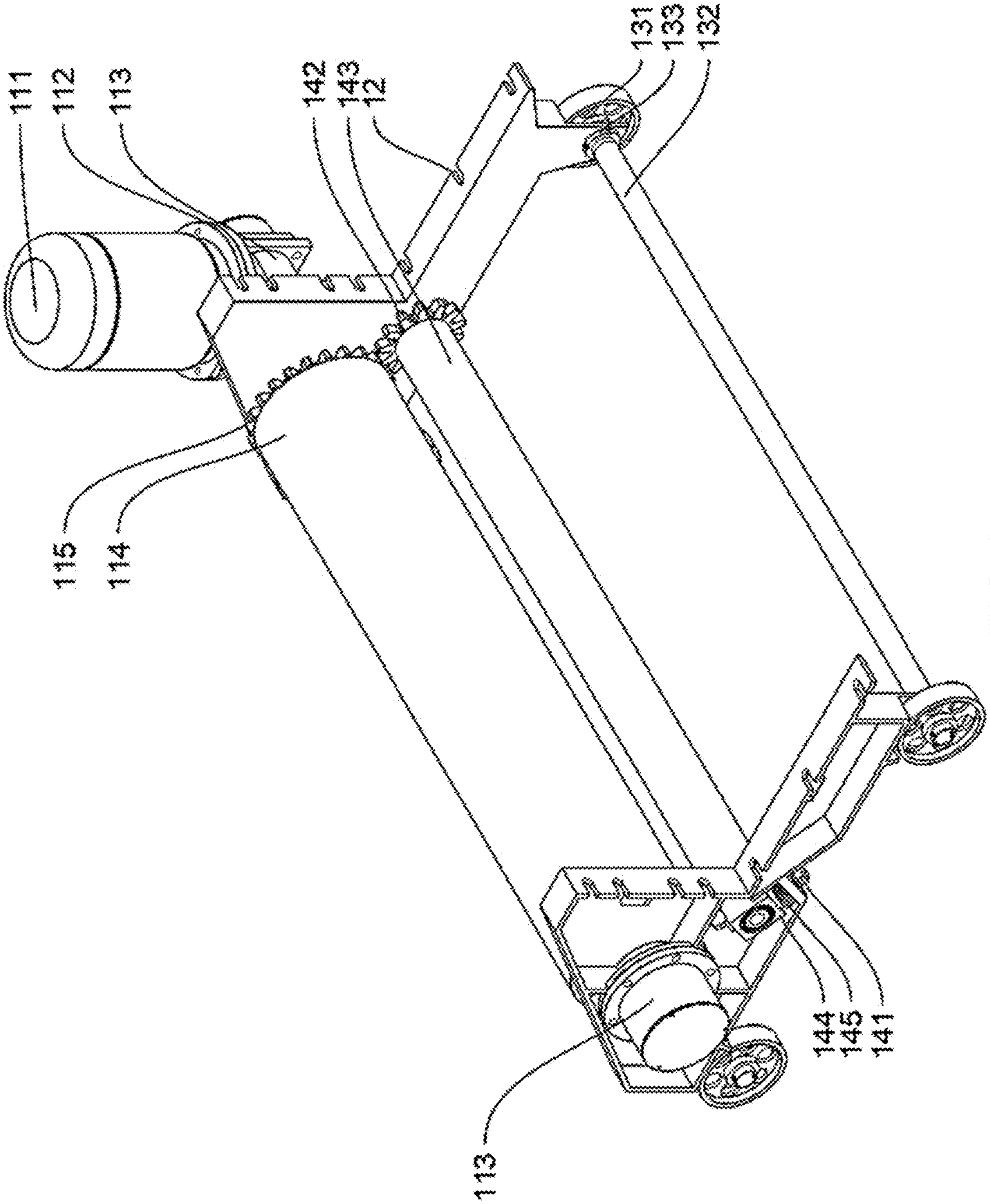
FIG. 3 is a schematic three-dimensional view of a power mechanism.
Figure 4:
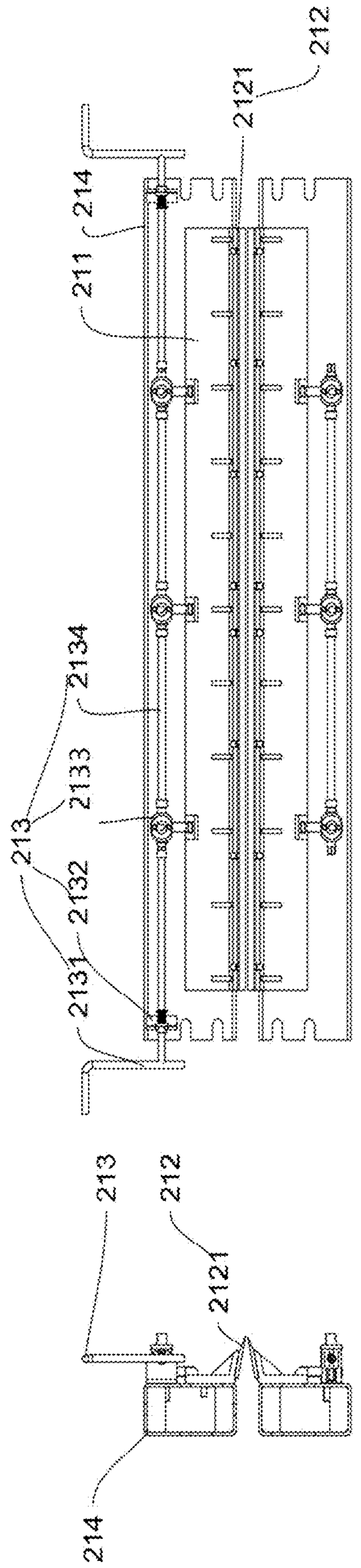
FIG. 4 shows a front view and a side view of a flat cutting part.
Figure 5:
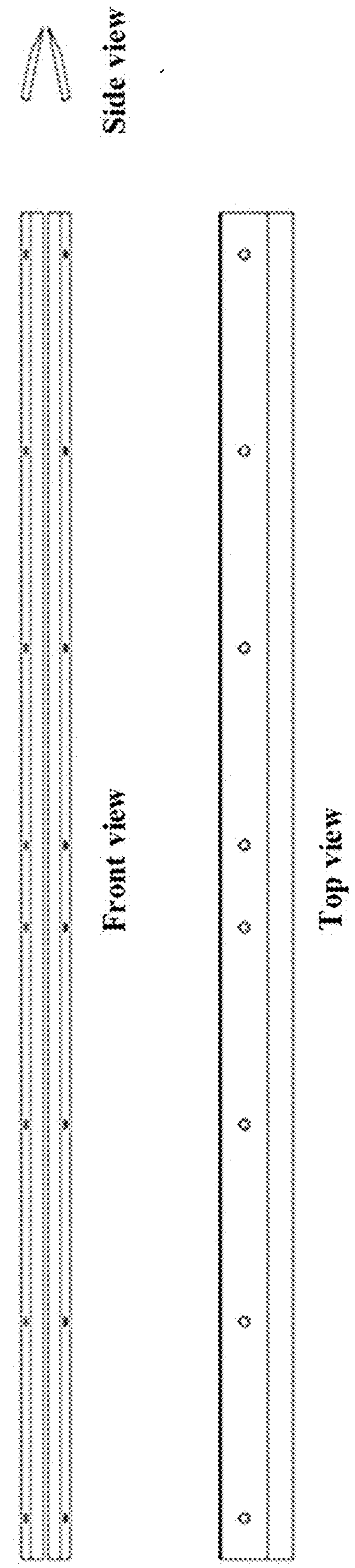
FIG. 5 shows three-view drawings of a flat cutter.
Figure 6:
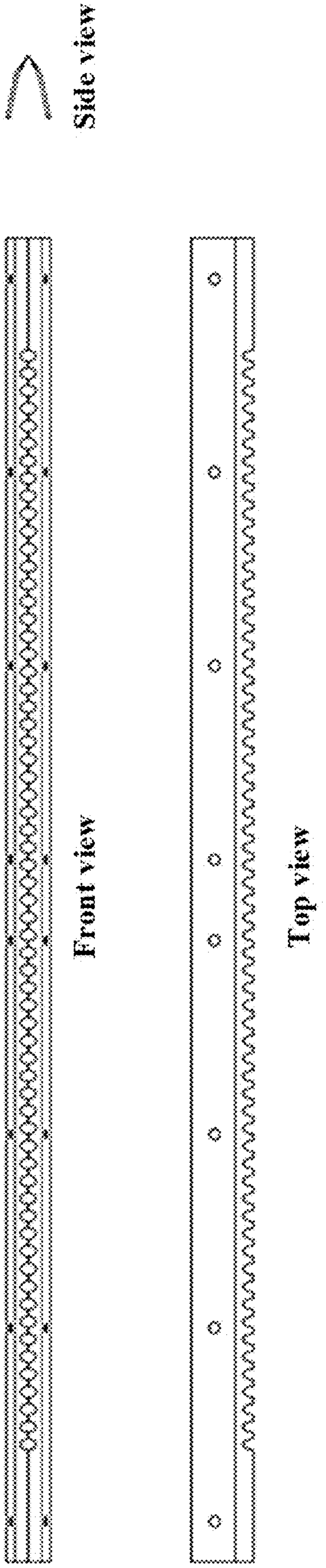
FIG. 6 shows three-view drawings of a large-toothed cutter.
Figure 7:
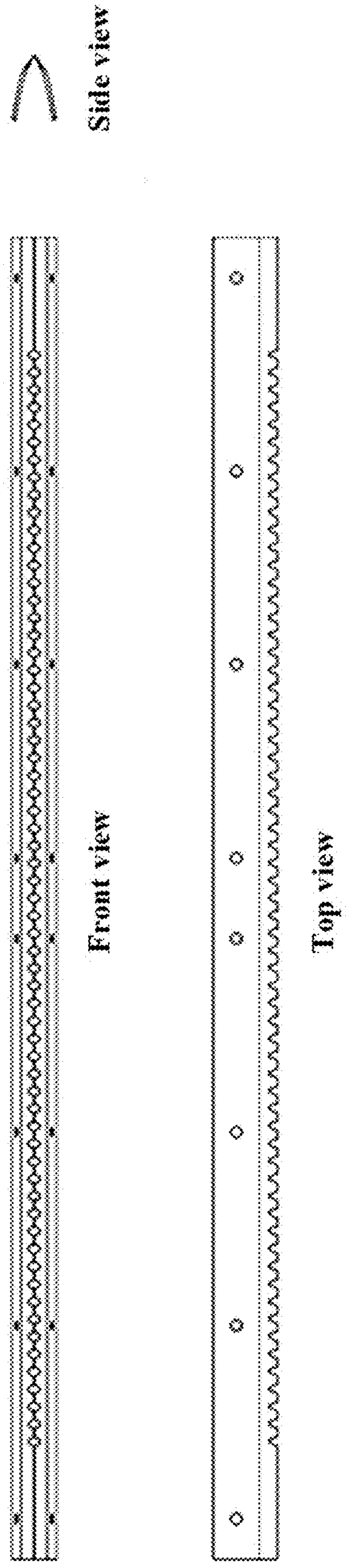
FIG. 7 shows three-view drawings of a small-toothed cutter.
Figure 8:
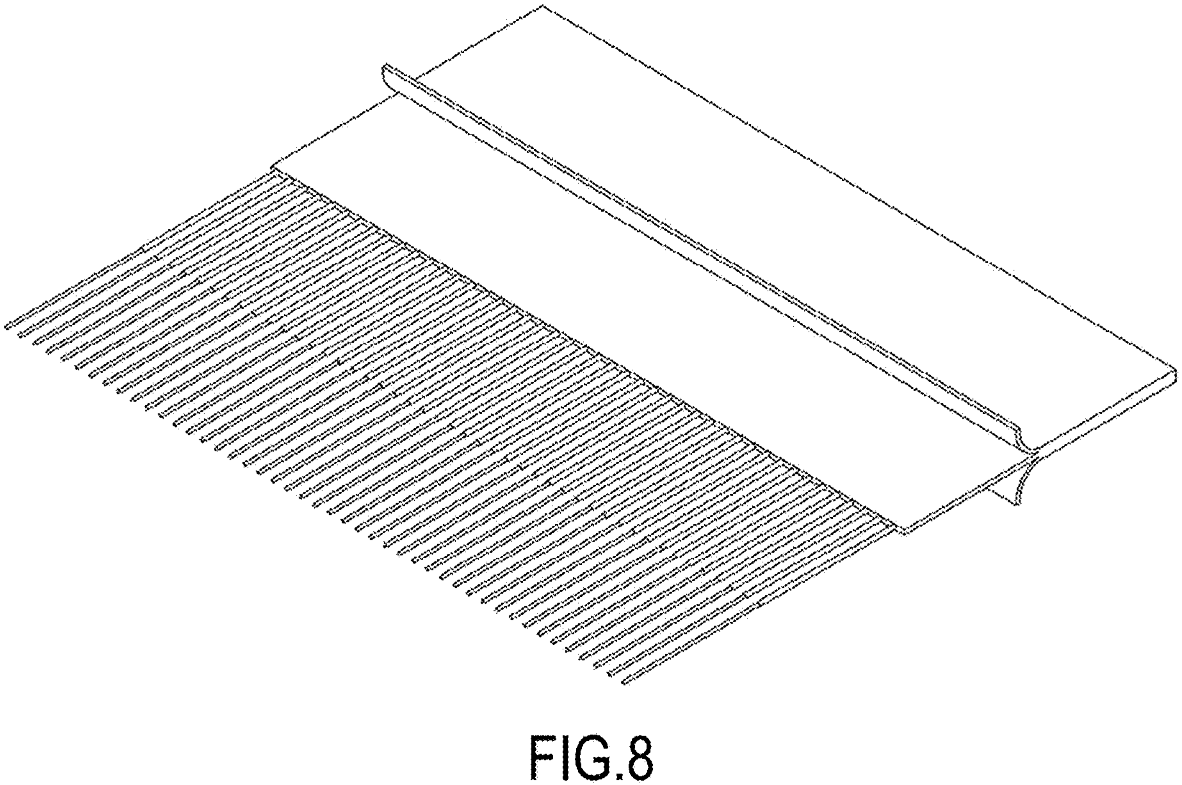
FIG. 8 is a schematic view showing a rapid separation process of a steel cord belt.
Figure 9:
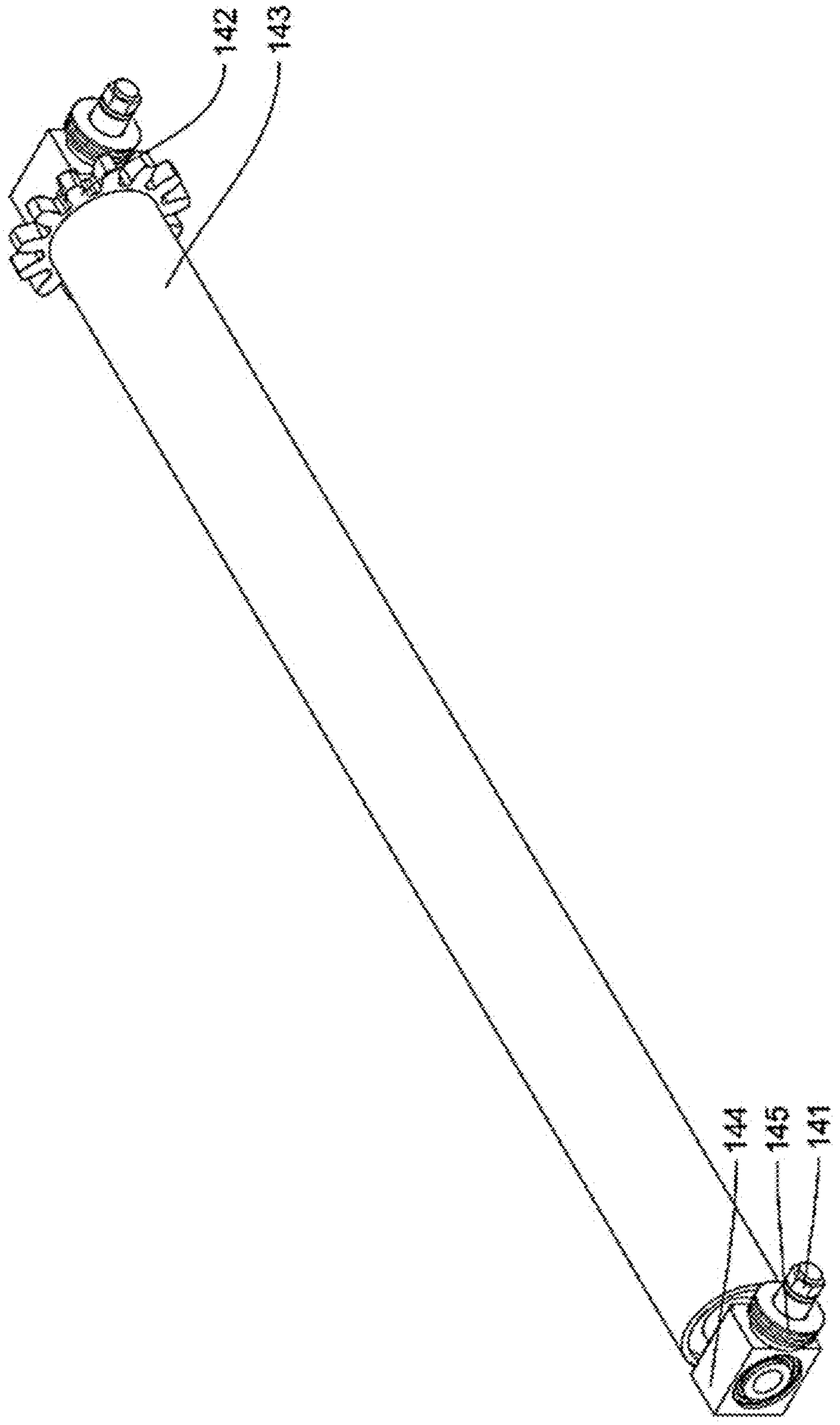
FIG. 9 is a schematic three-dimensional view of the structure of a pressing part.
Figure 10:
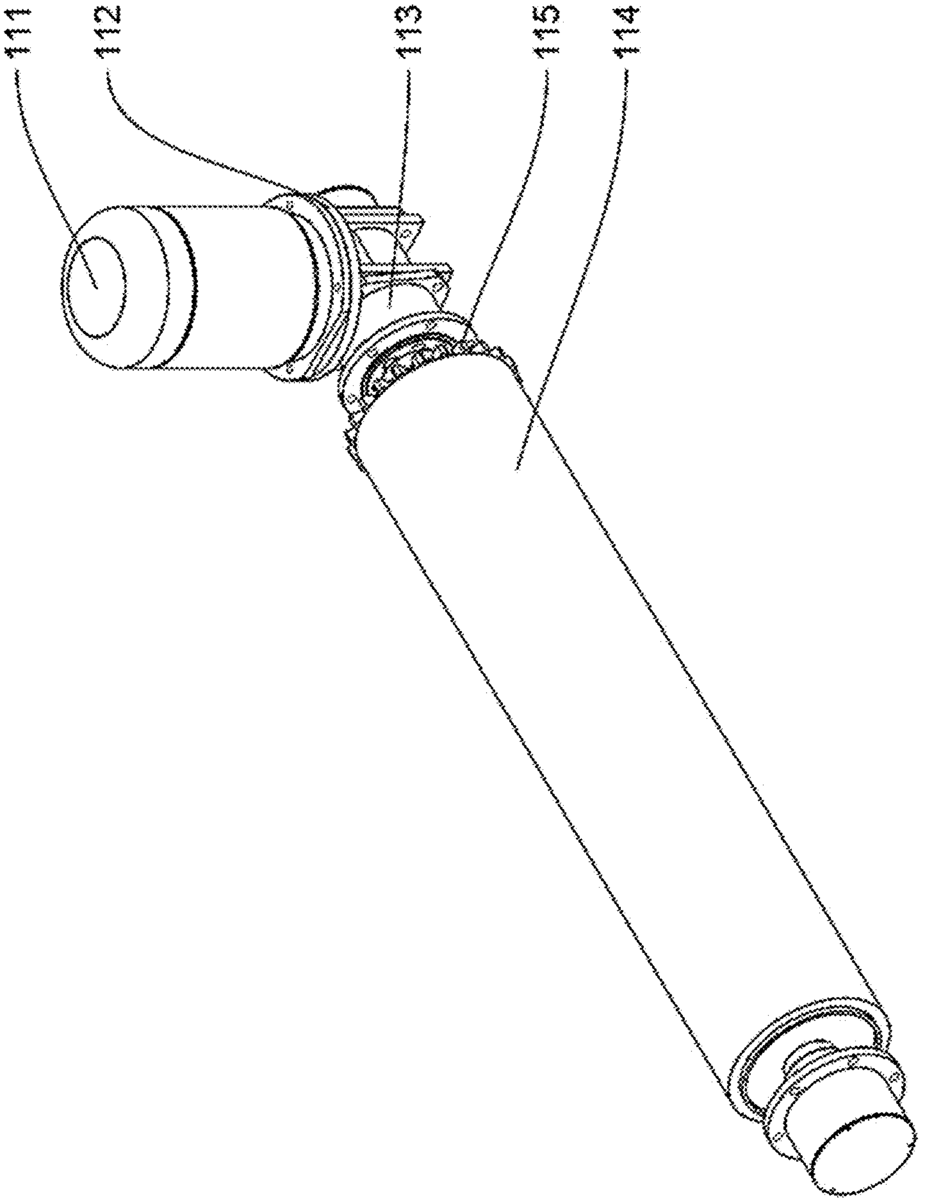
FIG. 10 is a schematic view of a cutter adjustment seat.
Figure 11:
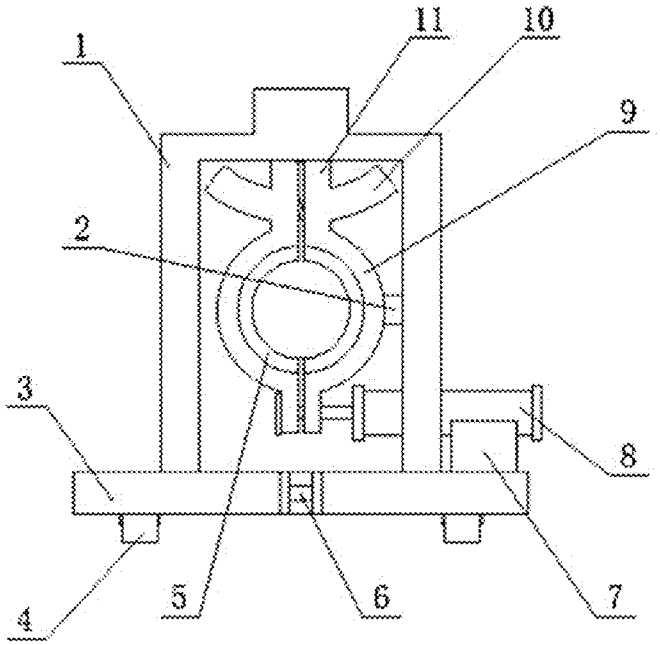
FIG.11 (Prior art)
FIG. 11 is a schematic view of a layered rubber belt stripping machine.
Figure 12:
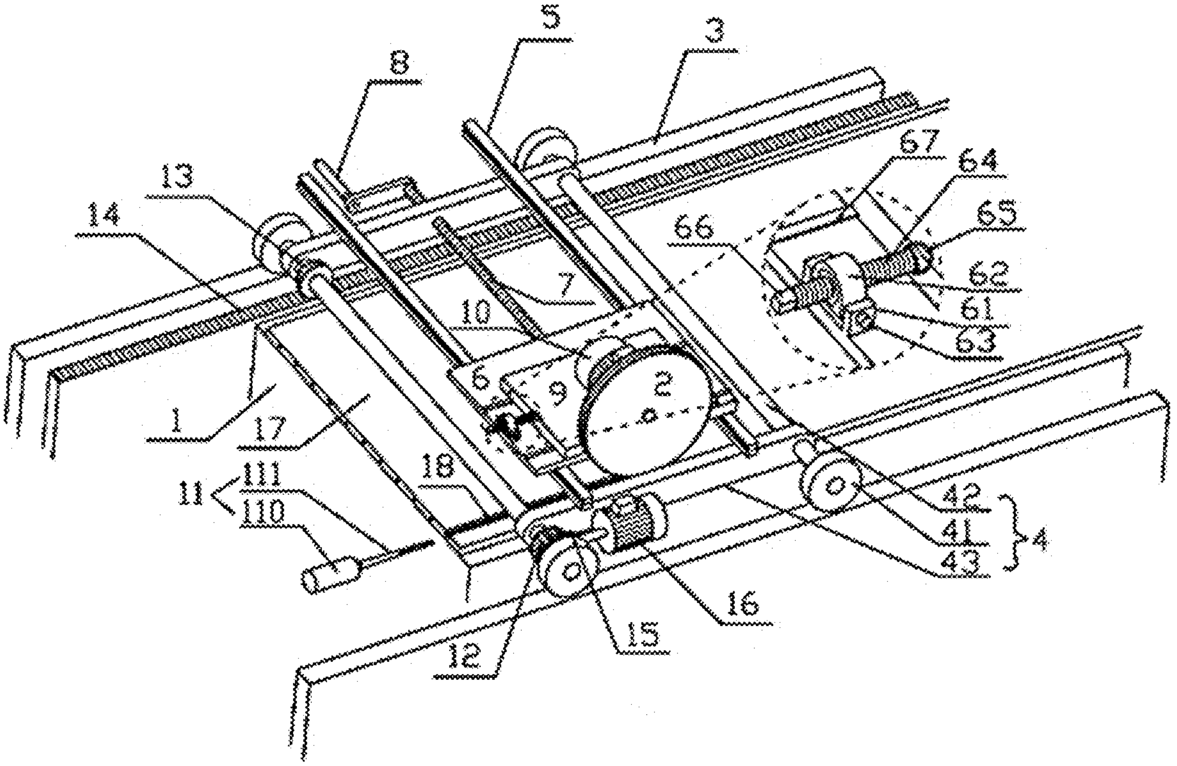
FIG.12 (Prior art)
FIG. 12 is a schematic view of a belt joint steel cord rapid separator and a separation method thereof.
Figure 13:
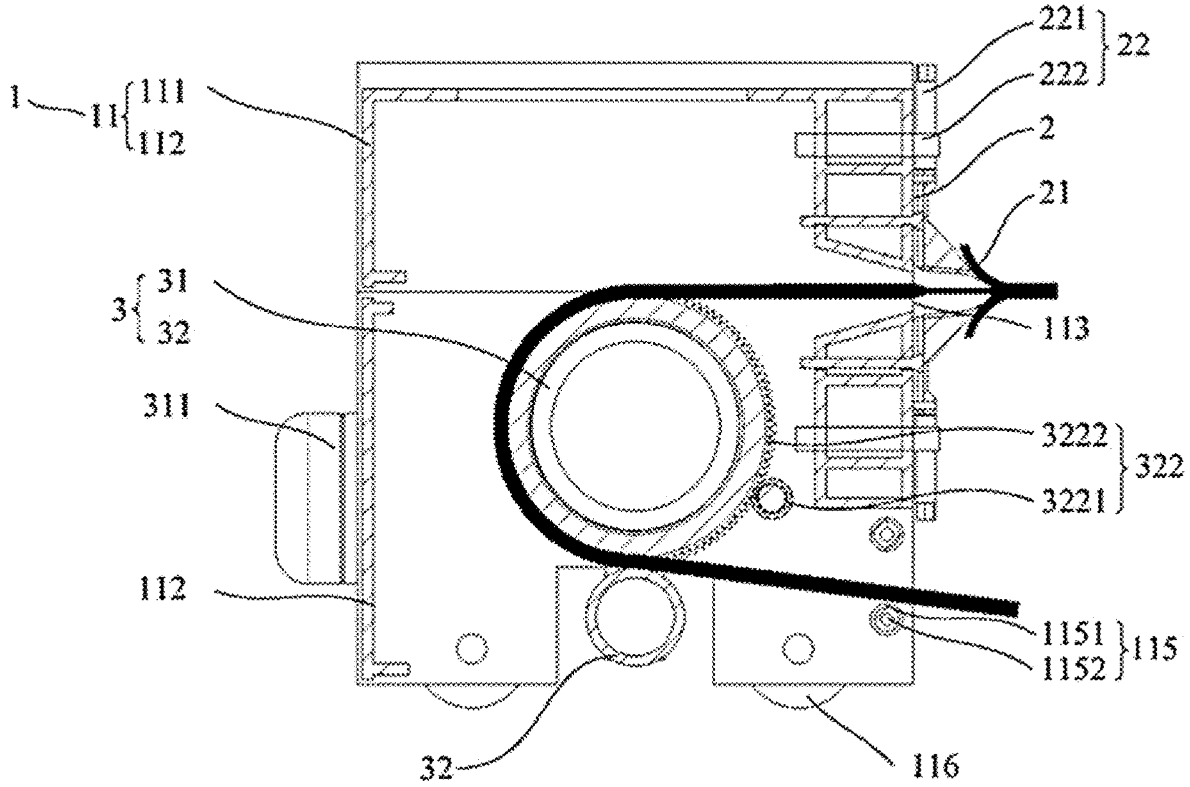
FIG.13 (Prior art)
FIG. 13 is a schematic view of a device for separating steel cords of a conveyor belt.

Referring to FIG. 1 to FIG. 11, the split-type device for continuously and rapidly separating a steel cord belt of the present disclosure includes a power mechanism 1, a driving part 11, a frame 12, a moving part 13, a pressing part 14, a cutting mechanism 2, a flat cutting part 21, a large-toothed cutting part 22, a small-toothed cutting part 23, connectors 24, and a holding mechanism 3. The power mechanism 1 includes the driving part 11, the frame 12, the moving part 13, and the pressing part 14. The driving part 11 and the pressing part 14 are mounted on the frame 12 and are configured for driving and clamping the steel cord belt.

The moving part 13 is mounted below the frame 12 and is configured for moving the power mechanism 1.

The driving part 11 includes a motor 111, a motor base 112, a gearbox 113, a power roller 114, and a driving gear 115. The motor 111 and the motor base 112 are connected via bolts. The motor 111 serves as a power source and the power is transmitted to the power roller 114 through the output shaft of the gearbox 113. The driving gear 115 is mounted on the power roller 114 on one side of the motor 111.

The pressing part 14 includes pressure nuts 141, a driven gear 142, a press roller 143, press roller sliding blocks 144, and disc springs 145. The press roller sliding blocks 144 on two ends of the press roller are adjusted to change the position of the press roller 143 and the distance between the press roller 143 and the power roller 114 changes accordingly.

The disc springs 145 are respectively mounted between the pressure nuts 141 and the press roller sliding blocks 144. The pressure nuts 141 are adjusted to change the elastic force of the disc springs 145 and the press roller 143 tightly presses the steel cord belt against the power roller 114 to provide sufficient friction for the steel cord belt. The driven gear 142 is mounted on one end of the press roller 143 and meshes with the driving gear 115 on the power roller 114. The press roller 143 rotates along with the power roller 114, the surface of the press roller 143 receives friction evenly, and the service life of the press roller 143 is increased.

The moving part 13 includes moving wheels 131, moving wheel connecting rods 132, and round nuts 133. Each of the moving wheel connecting rods 132 is mounted in mounting holes on two sides of the bottom of the frame 12 and is fixedly connected by two of the round nuts 133. The moving wheels 131 are respectively mounted on the external sides of the round nuts 133 and are configured for moving the power mechanism 1.

The cutting mechanism 2, including the flat cutting part 21, the large-toothed cutting part 22, and the small-toothed cutting part 23, is mounted on the frame 12 and is connected via first connectors 241. The steel cord belt sequentially passes through the flat cutting part 21, the large-toothed cutting part 22, and the small-toothed cutting part 23 for separation of top and bottom rubber covers, primary separation of a steel cord layer, and secondary separation of the steel cord layer. The three cutting parts are transversely and longitudinally connected via second connectors 242 and third connectors 243 respectively.

Each of the cutting parts includes a cutter seat 211, a cutter 212, a handle positioning mechanism 213, and a cutter rack 214. The handle positioning mechanism 213 includes handles 2131, hand-crank seats 2132, cutter adjustment seats 2133, and sleeve rods 2134. The hand-crank seats 2132 are fixedly connected to the cutter rack 214. The handles 2131 are turned to adjust the vertical positions of the cutter adjustment seats 2133, and the cutter seat 211 and the cutter 212 are configured for moving up and down freely. The cutter 212 is divided into three types: a flat cutter 2121, a large-toothed cutter 2122, and a small-toothed cutter 2123, each being mounted on the cutter seat 211 via bolts. The cutter adjustment seats 2133 are worm drive devices configured for outputting the rotation of the handles 2131 into a vertical linear motion. The cutter adjustment seats 2133 are integrated by connecting the worms with the sleeve rods 2134.

The flat cutter 2121 includes an upper flat cutter and a lower flat cutter. When the power roller 114 drives the steel cord belt to move, the upper and lower flat cutters simultaneously cut the top and bottom rubber covers of the steel cord belt.

The toothed cutter includes an upper toothed cutter and a lower toothed cutter, each having a semicircular blade, and the upper and lower toothed cutters fit together to form a circular blade. The circular blade of the large-toothed cutter has a diameter of $D1=(d+L)/2$, the diameter of the steel cord being d and the thickness of the steel cord layer being L. The diameter D1 of the circular blade of the large-toothed cutter is larger than the diameter of the steel cord, and the primary separation of the rubber between the steel cords is completed without damaging the steel cords and the circular blade.

The circular blade of the small-toothed cutter has a diameter of D2 being equal to the diameter d of the steel cord, and the secondary separation of the rubber between the steel cords is completed.

The connectors 24 include the first connectors 241, the second connectors 242, and the third connectors 243. The first connectors 241 each consist of a hexagon short bolt and a nut and are configured for connecting the cutting parts to the frame 12.

The second and third connectors each consist of a hexagon bolt, a nut, and a threaded sleeve and are configured for transversely and longitudinally connecting the cutting parts.

The holding mechanism 3 includes a holding rack 32, holding rollers 31, roller lock pieces 34, and holding wheels 33. The holding rollers 31 are mounted in mounting holes on two sides of the holding rack 32, and the roller lock pieces 34 are externally mounted on two ends of each of the holding rollers 31 to prevent each of the holding rollers 31 from falling off. The holding wheels 33 are mounted on the bottom of the holding rack 32 and are configured for moving the holding mechanism 3.

The working principle of the split-type device for continuously and rapidly separating a steel cord belt is as follows: The structure of the steel cord belt can be divided into a top rubber cover, a steel cord layer, and a bottom rubber cover. Before separation of the belt, the belt is manually fed from the bottom of the holding mechanism 3, then passes through the press roller 143, the power roller 114, the small-toothed cutting part 23, the large-toothed cutting part 22, and the flat cutting part 21, and is finally laid flat on the holding rollers 31 of the holding mechanism 3. The number of the holding mechanism 3 can be set according to the length of the belt joint to be separated. After the belt is laid, separation of the top and bottom rubber covers, primary separation of the steel cord layer, and secondary separation of the steel cord layer are performed in sequence.

The separation of the top and bottom rubber covers is as follows: The top and bottom rubber covers of the steel cord belt are separated at the flat cutting part 21. By turning the handles 2131 of the handle positioning mechanism 213, the worm drive devices in the cutter adjustment seats 2133 enable the cutter seat 211 to approach the belt and make the flat cutter 2121 embedded in the belt, the vertical distance L1 between the upper and lower blades of the flat cutter being equal to the thickness L of the steel cord layer. Meanwhile, the positions of the pressure nuts 141 and the press roller sliding blocks 144 of the pressing part 14 are adjusted to tightly press the belt between the power roller 114 and the press roller 143. When the motor 111 is started, the driving power is transmitted to the power roller 114 through the output shaft of the gearbox 113, and the driving gear 115 meshes with the driven gear 142 to transmit power, enabling the press roller 143 to rotate. Therefore, the belt on the holding rack is clamped by the power roller 114 and the press roller 143 to move linearly, and the flat cutter 2121 embedded in the belt can completely cut the top and bottom rubber covers of the belt.

The primary separation of the steel cord layer is as follows: When the belt with the top and bottom rubber covers being cut off moves to the large-toothed cutting part 22, the power roller 114 stops rotating. By turning the handles 2131 of the handle positioning mechanism 213, the cutter seat 211 moves to make the large-toothed cutter 2122 embedded in the steel cord layer, and the steel cords are each within a circular tooth hole of the large-toothed cutter 2122. Then, the power roller 114 continues to rotate, and the steel cords covered with rubber are separated from one another under the circular cutting effect of the large-toothed cutter 2122. Therefore, the primary separation of the steel cord layer is completed.

The secondary separation of the steel cord layer is as follows: When the steel cords covered with rubber move to the small-toothed cutting part 23, the power roller 114 stops rotating. By turning the handles 2131 of the handle positioning mechanism 213, the cutter seat 211 and the small-toothed cutter 2123 move up and down, making each of the steel cords within a circular tooth hole of the small-toothed cutter 2123. Then, the power roller 114 continues to rotate, and the rubber covered on the steel cords is removed under the circular cutting effect of the small-toothed cutter 2123. Therefore, the secondary separation of the steel cord layer is completed.

After the separation of the top and bottom rubber covers, the primary separation of the steel cord layer, and the secondary separation of the steel cord layer are performed in sequence, the continuous and rapid separation of the belt is completed in a single pass.

The above preferred embodiments of the present disclosure are only intended for illustration. The preferred embodiments do not cover all the details and shall not be construed as limitations to the present disclosure. It is obvious that many modifications and variations can be made based on the content of this specification. These embodiments are selected and described in detail in this specification to better explain the principles and practical applications of the present disclosure, so that persons skilled in the art can better understand and utilize the present disclosure. The present disclosure is limited only by the appended claims and their full scope and equivalents.

What is claimed is:

1. A device for continuously and rapidly separating a steel cord belt, comprising a power mechanism, a cutting mechanism, connectors, and a holding mechanism, wherein the cutting mechanism comprises the flat cutting part, the large-toothed cutting part, and the small-toothed cutting part, the power mechanism comprises the driving part, the frame, the moving part, and the pressing part; the driving part and the pressing part are mounted on the frame; and the driving part and the pressing part are configured for driving and clamping the steel cord belt;

the moving part is mounted below the frame;

the driving part comprises a motor, a motor base, a gearbox, a power roller, and a driving gear, the motor and the motor base are connected via bolts, the motor serves as a power source and power is transmitted to the power roller through an output shaft of the gearbox, and the driving gear is mounted on the power roller on one side of the motor;

the pressing part comprises pressure nuts, a driven gear, a press roller, press roller sliding blocks, and disc springs, wherein the press roller sliding blocks on two ends of the press roller are adjusted to change a position of the press roller and a distance between the press roller and the power roller changes accordingly;

the disc springs are respectively mounted between the pressure nuts and the press roller sliding blocks; the pressure nuts are adjusted to change an elastic force of the disc springs and the press roller tightly presses the steel cord belt against the power roller to provide sufficient friction for the steel cord belt; the driven gear is mounted on one end of the press roller and meshes with the driving gear on the power roller; the press roller rotates along with the power roller, a surface of the press roller receives friction evenly, and a service life of the press roller is increased.

2. The device for continuously and rapidly separating the steel cord belt according to claim 1, wherein the moving part comprises moving wheels, moving wheel connecting rods, and round nuts, wherein each of the moving wheel connecting rods is mounted in mounting holes on two sides of a bottom of the frame and is fixedly connected by two of the round nuts; the moving wheels are respectively mounted on external sides of the round nuts and are configured for moving the power mechanism.

3. The device for continuously and rapidly separating the steel cord belt according to claim 2, wherein the connectors comprise first connectors, second connectors, and third connectors, the cutting mechanism is mounted on the frame and is connected via the first connectors; the steel cord belt sequentially passes through the flat cutting part, the large-toothed cutting part, and the small-toothed cutting part for separation of a top rubber cover and a bottom rubber cover of the steel cord belt, primary separation of a steel cord layer, and secondary separation of the steel cord layer; the flat cutting part, the large-toothed cutting part, and the small-toothed cutting part are transversely and longitudinally connected via the second connectors and the third connectors respectively.

4. The device for continuously and rapidly separating the steel cord belt according to claim 3, wherein the flat cutting part, the large-toothed cutting part, and the small-toothed cutting part each comprise a cutter seat, a cutter, a handle positioning mechanism, and a cutter rack, wherein the handle positioning mechanism comprises handles, hand-crank seats, cutter adjustment seats, and sleeve rods; the hand-crank seats are fixedly connected to the cutter rack, the handles are turned to adjust vertical positions of the cutter adjustment seats, and the cutter seat and the cutter are configured for moving up and down freely; the cutter is divided into three types: a flat cutter, a large-toothed cutter, and a small-toothed cutter, the flat cutter, the large-toothed cutter and the small-toothed cutter are mounted on the cutter seat via other bolts; the cutter adjustment seats are worm drive devices configured for outputting rotation of the handles into a vertical linear motion; the cutter adjustment seats are integrated by connecting worms through the sleeve rods.

5. The device for continuously and rapidly separating the steel cord belt according to claim 4, wherein the flat cutter comprises an upper flat cutter and a lower flat cutter, wherein when the power roller drives the steel cord belt to move, the upper flat cutter and the lower flat cutter simultaneously cut the top rubber cover and the bottom rubber cover of the steel cord belt;

the large-toothed cutter and the small-toothed cutter each comprise an upper toothed cutter and a lower toothed cutter, each of the upper toothed cutter and the lower toothed cutter has a semicircular blade, and the upper toothed cutter and the lower toothed cutter fit together to form a circular blade; the circular blade of the large-toothed cutter has a diameter of $D1=(d+L)/2$, a diameter of steel cords being d and a thickness of the steel cord layer being L; the diameter D1 of the circular blade of the large-toothed cutter is larger than the diameter of the steel cords, and a primary separation of a rubber between the steel cords is completed without damaging the steel cords and the circular blade;

the circular blade of the small-toothed cutter has a diameter of D2 being equal to the diameter d of the steel cords, and a secondary separation of the rubber between the steel cords is completed.

6. The device for continuously and rapidly separating the steel cord belt according to claim 5, wherein the first connectors each consist of a hexagon short bolt and a nut and are configured for connecting the flat cutting part, the large-toothed cutting part, and the small-toothed cutting part to the frame;

the second connectors and the third connectors each consist of a hexagon bolt, another nut, and a threaded sleeve and are configured for transversely and longitudinally connecting the flat cutting part, the large-toothed cutting part, and the small-toothed cutting part.

7. The device for continuously and rapidly separating the steel cord belt according to claim 6, wherein the holding mechanism comprises a holding rack, holding rollers, roller lock pieces, and holding wheels, the holding rollers are mounted in other mounting holes on two sides of the holding rack, the roller lock pieces are externally mounted on two ends of each of the holding rollers to prevent the each of the holding rollers from falling off, and the holding wheels are mounted on a bottom of the holding rack and are configured for moving the holding mechanism.

* * * * *